Patented Nov. 24, 1925.

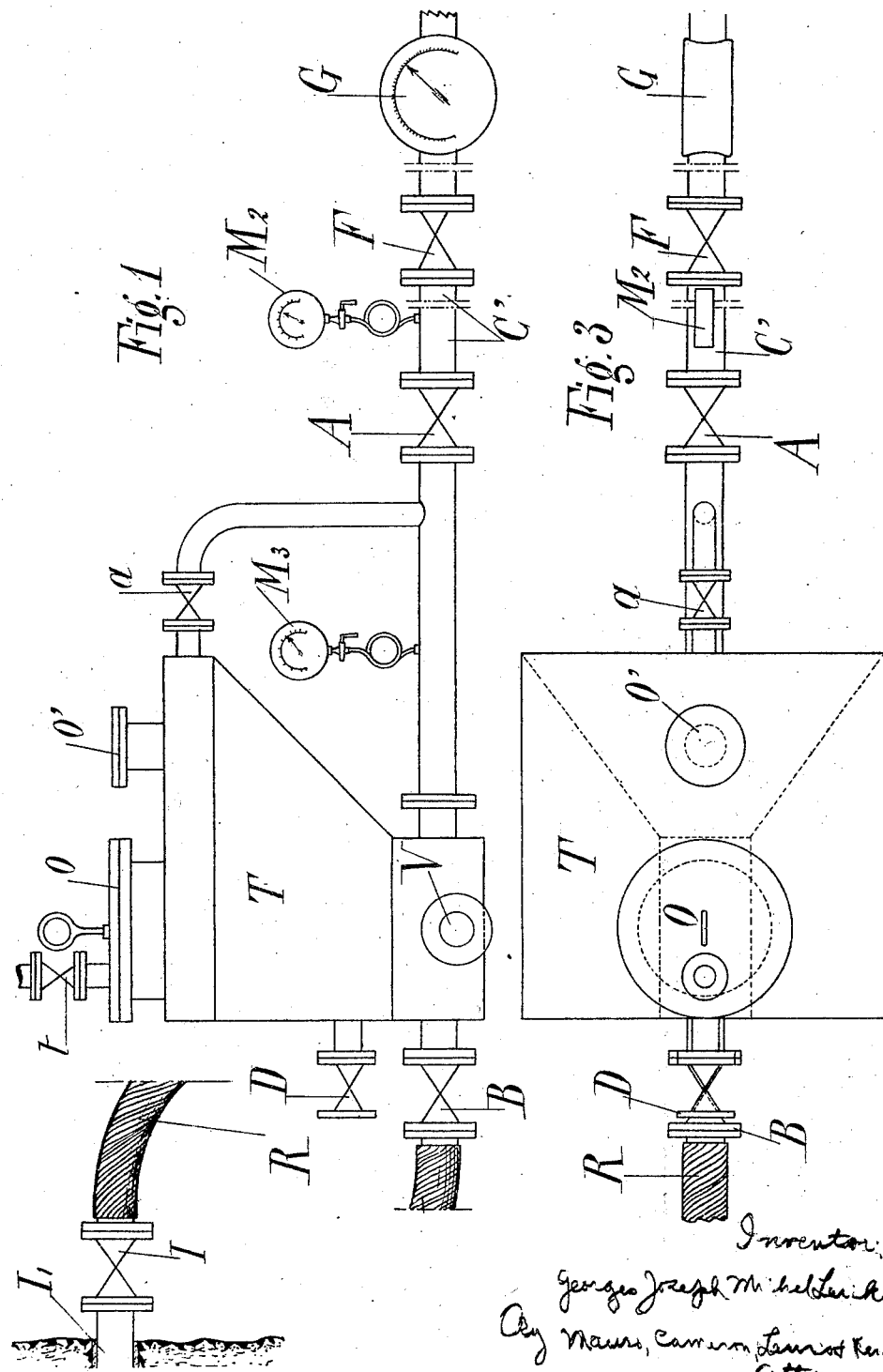

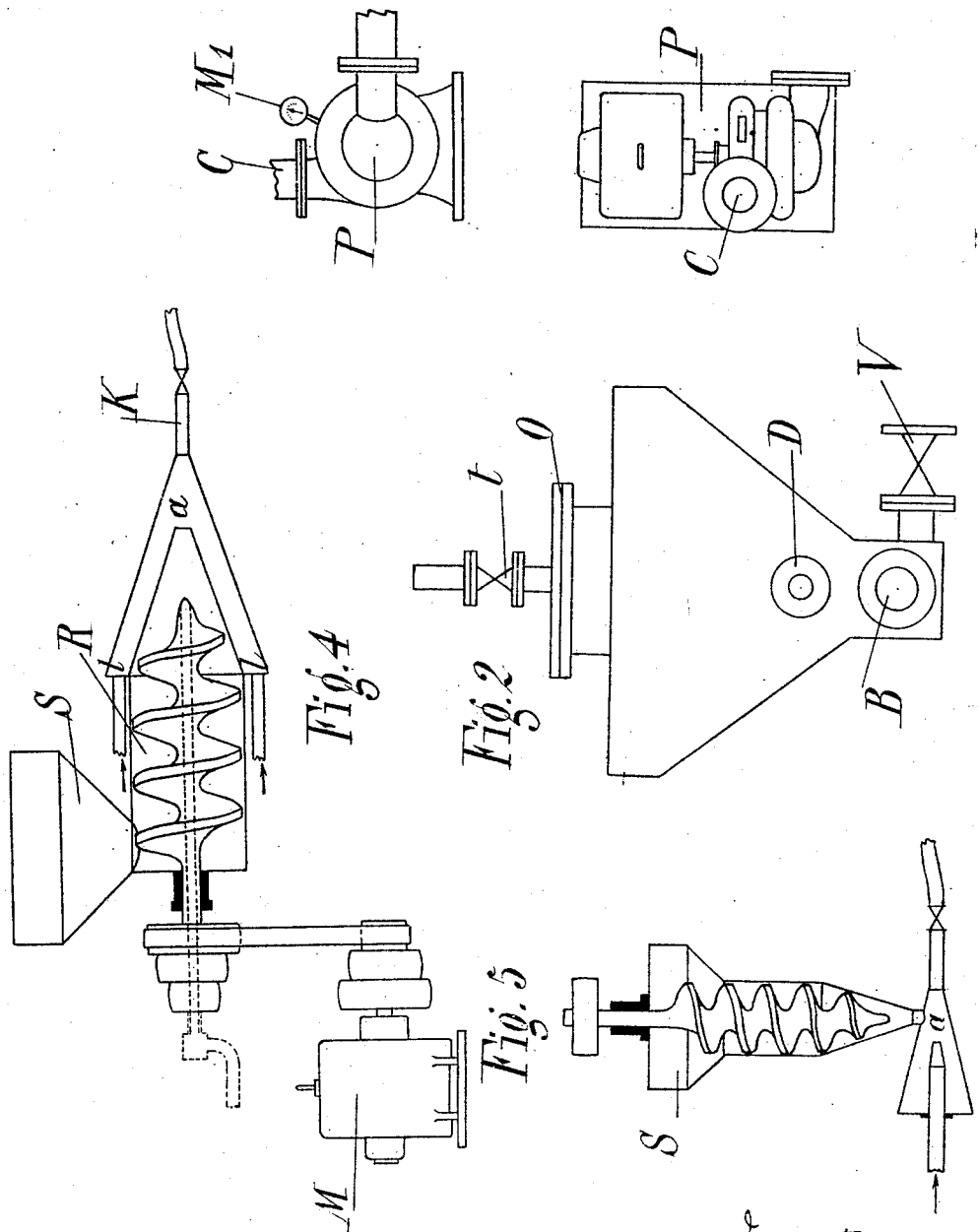

1,563,200

UNITED STATES PATENT OFFICE.

GEORGES JOSEPH MICHEL LEICKNAM, OF JARNY, FRANCE.

FILLING UP, PUDDLING, WARPING, CONCRETING, CEMENTING, ETC., BY MEANS OF FLUSHING WITH WATER UNDER PRESSURE.

Application filed November 30, 1923. Serial No. 677,920.

*To all whom it may concern:*

Be it known that I, GEORGES JOSEPH MICHEL LEICKNAM, citizen of the Republic of France, residing at Jarny, France, have invented certain new and useful Improvements in Filling Up, Puddling, Warping, Concreting, Cementing, Etc., by Means of Flushing with Water Under Pressure, of which the following is a specification.

This invention relates to a process, the principal applications of which are the stopping or closing of cracks, fractures, breaches and the like, such as encountered in mines, quarries, tunnels and shaft borings. The process of the present invention may also be employed for the consolidation of land and foundations; for execution of constructions, and for linings or plastering of walls, and the like.

The characteristic features of the present process are:

The materials are not mechanically stirred or driven after mixing with water, as in the processes now in use; the presence of air or other gas in the receptacle containing the materials is prejudicial for the success of the present process; the mixture of materials and water is not driven or conveyed by water but is projected by the vis viva or potential acquired when it is confined, during a sufficient period of time, in a receptacle communicating with a source of water under pressure; when this process is employed for stopping or closing cracks, crevices, encountered in mines, the measuring instruments such as manometers, meters or the like, are set only on pipes containing water exclusively so that methodical and accurate operation of the instruments is insured.

Broadly stated, this process consists in the following steps successively performed, discontinuously or continuously:

Loading of the materials in a receptacle; closing of the loading aperture or apertures of the receptacle, connection of the latter with a source of water under pressure, and displacement when required of any air which may be present within the receptacle; establishment of the hightest static pressure in the receptacle which can be obtained from the source of water under pressure by communication of the receptacle with said source; and projection of the mixture of materials and water by the vis viva acquired by the mixture in accordance with the static pressure previously established in the receptacle, the mixture being carried through one or more pipe systems, during the whole or part of its travel from the receptacle to the point of destination.

The apparatus employed in carrying out this process may be designed and constructed in many different forms but they all fall under two categories according to whether the application of the process is discontinuous or continuous. Any application of the process preferably includes the use of one or more meters for the water supply and the use of one or more manometers for obtaining methodical preparation and control of the apparatus.

The accompanying drawings, illustrate by way of example, apparatus which may be employed in carrying out the process.

In said drawings Figs. 1, 2 and 3, show respectively an elevation, an end view and a plan view of an apparatus for discontinuous application of the process.

Figures 4 and 5 represent two forms of apparatus for a continuous application of the process.

With the class of apparatus shown in Figs. 1 to 3, granulated materials of very variable sizes (sand, ashes, gravel, granulated slag, etc.,) may be used, as well as pastes made up with fine materials.

In the Figures 1, 2 and 3:

T indicates a receptacle in which the charges are loaded.

O is an aperture for loading the granular materials, and is either fitted with a cover, a valve or a register.

O' is a similar aperture closed by a cover or by a valve for the introduction of liquid charges.

$t$ indicates an air relief valve.

A is a sluice valve for the admission of water.

$a$ is an auxiliary valve through which water may be admitted if required to facilitate the discharge of the materials during the flushing, said valve being interposed in a branch $a'$ of conduit C, C'.

B is a valve for the outlet of the charges.

D represents a decanting valve permitting the removal of any excess of water after each injection, without removing from the receptacle the materials which it may still contain.

V is an evacuation valve.

C C' is the water pipe system, and R the injection pipe system.

I I¹ represent respectively the injection valve and the injection tube, the whole arrangement forming the injection head.

F is a valve to regulate the supply of water under pressure.

G is a water meter, and $M^1$, $M^2$, $M^3$ are manometers.

P indicates a water pump with variable driving pressure.

It is understood that the process does not necessarily include the use of manometers and the water meter. Such apparatus, however, are indispensable if it is desired to operate methodically and economically.

A single manometer by the side of the flushing valve A may be sufficient, but it is preferable to provide for two near said valve in order to increase safety in the controlling.

It is not indispensable to provide two charging apertures, or the branch pipes controlled by the valve $a$, and the tube and the decanting valve D, or the evacuation valve V, but it is evident that it is more practical to use an apparatus containing such arrangements.

Instead of one inlet for the flush water and an outlet for the injections, the receptacle may have several of such inlets and outlets.

Finally instead of a pump, any other apparatus may be employed to obtain water under pressure. In mines, in particular, a branch may be used on the exhaust column. The pressure so obtained and the regulation by manoeuvring the valve F, may be sufficient in a large number of cases. In the example of discontinuous working hereinafter mentioned it is supposed that the object of the injections is to stop a water leakage issuing from a fracture found in front of a mining gallery and revealed by a boring used as an injection opening.

In the first place the characteristics of the fracture to be stopped and of the surrounding ground is determined as exactly as possible (by measuring the pressure and the quantity as compared with the results of such measures with others which may have been previously observed etc.).

Before commencing the injection of the materials it is advisable to again observe the natural pressure and flow, that is to say, the pressure and the flow of the water through the injection opening. For that purpose the receptacle is filled up with said water. After allowing the air to escape through $t$, the pressure on $M^2$ and $M^3$ is read off. The time necessary to fill up the receptacle and the capacity of the latter show the corresponding flow under such pressure. By then operating the pump and progressively opening the valves F and A, the pressure at $M^1$ is observed and the apertures of F and A through which an injection of pure water is made with a flow equal to the flow from the fracture whilst exceeding as little as possible the zone which it is desired to stop, are also observed.

The maximum openings of the valves F and A and the minimum pressure to be adopted for the injection of the material are thus ascertained. After closing the sluices B and A, the receptacle is evacuated either partly through D or entirely through V, according to the composition character and density of the charges to be used.

When the charge has been introduced into the receptacle and the latter is closed again, the air cock $t$ is opened and then, slightly, the sluice valve A and as the case may be the sluice valve $a$. When all the air has been expelled and after the cock $t$ has been closed and the manometers $M^2$ $M^3$ indicate a pressure equal to the pressure produced by the pump, valve A is operated for the purpose of giving the requisite opening for the clearance. Then the valve B is operated.

If the charge is well adapted for the fracture, the manometers $M^2$ and $M^3$ show a deflection in the pressure, the pressure then rises and becomes stable at a final level inferior or equal to the level indicated by the manometer $M^1$ of the pump. The known capacity of the receptacle and the reading of the indications of the water meter determine the duration of the injection. The latter is stopped by closing the sluices B and A.

The observations made in the course of this first injection serve to regulate the conditions to be observed for the following injection and so on, the operations being always carried out in the same way.

When several injections follow one another efficiently, the deflection of the pressure noted on the manometers $M^2$, $M^3$ becomes weaker and weaker and the final pressure indicated by said manometers approaches nearer to the pressure indicated by the manometer $M^1$. Parallelly the flow per unit of time of the injection becomes weaker and weaker and consequently the duration of the injections becomes longer.

When the deflection observed on the manometers $M^2$, $M^3$ has become negligible it is advisable, after ascertaining whether such effect is not due to an obstruction in the injection pipes, to again regulate the flow and the flushing pressure by a test with pure water as in the first place and generally to adopt afterwards charges of a smaller size or density.

In many cases there is an advantage in postponing for a few days this new regulating operation and the series of injections determined by it. At the end of each series of operations the valve 1 is closed and the connection R, as well as the receptacle with its accessories, are cleaned.

When the fracture to be stopped is very narrow, that is to say, amounts to a fissure only, it is advantageous to replace the injection connection R by two or more smaller connections corresponding each to an injection opening and the total of the sections of which is equal to the section of R. This mode of precedure facilitates the introduction and division of the materials in the fissure.

It is obvious that an arrangement of the category shown in Figs. 1, 2, and 3 makes it possible to vary ad infinitum the pressures and flows of injection, as well as the character and size of the materials. In certain cases it will be necessary to first cause a splitting of the ground by injections of pure water. In other cases where the natural flow cannot be attained it is advisable to first inject with large inert materials and to inject with cementing material only when the breach has been sufficiently closed by filling it, etc. A single receptacle properly conditioned can, even if it is of a small capacity, be sufficient for all the demands of the most varied conditions.

With the apparatus for continuous application of the process, shown in Figs. 4 and 5, only fine materials and pastes may be used and the materials are charged and progress in a receptacle under the influence of a mechanical device up to a point when they meet the water under pressure. The outlet of the receptacle is narrow and the necessary stoppages in front of this outlet and on the side of the arrival of the materials are secured by the great resistance to the penetration of the water opposed by the fine materials and pastes compressed by the mechanical device.

In the example of Fig. 4 the materials introduced through a hopper S in the receptacle R are propelled and compressed in the latter under the influence of an Archimedean screw V operated by a motor M. Elemental charges are so formed ahead the narrow aperture $a$ where the materials meet the water under pressure which arrives through the pipes 1 1. Each elemental charge is projected as soon as it has reached a vis viva sufficient to pass the aperture $a$. In the case of the variation shown by dotted lines in the same figure, the water comes through a pipe or passage arranged to coincide with the geometrical axis of the screw.

In the example of Fig. 5 the materials actuated by an Archimedean screw or by any other suitable means progress along a direction perpendicular to the axis of the receptacle and meet the water under pressure coming through $a$.

Apparatus of this category make it possible to vary the pressures and the flushing and the flow of injected materials in smaller proportions than in the case of the first category. Consequently this form of apparatus is preferably reserved for the execution of linings, plasterings, etc.

It goes without saying that it is advisable to employ Archimedean screws, and to line the inner surfaces of the cylinders in which the progression of the materials consisting of hard substances, china, etc., takes place.

The process and arrangement described have for the following advantages:

1. As the process only necessitates water under pressure which may be obtained by the most diverse machines and means and particularly with electrical centrifugal pumps, it makes it possible to obtain, in the simplest and most practical manner, variable injection pressures made progressively stronger and sometimes considerable as may be necessary by the initial and successive characteristics of the fractures.

2. The process makes it possible to regulate at will according to requirements, the flow of the injections by operating a single water valve.

3. The process facilitates the methodical preparation and control of the operations.

4. It is applicable with materials of the most different character and size (sand, gravel, ashes, slags, milks and pastes of cement, etc.), and it makes it possible to effect equally well, filling in, warping, concreting, cementation, etc.

5. Owing to the fact that it makes it possible to fill the large portion of the empty spaces by filling in with larger inert and cheap materials before injecting the expensive binding materials, such as cement, the process results in a very important saving in the stopping of large fractures or breaches and on the other hand permits the stoppage of fractures and the consolidation of the ground in numerous cases where other processes are inefficient or too expensive (open fractures on a larger surface or with several outlets as in flakey soil, etc.)

6. The general installation which is necessary for the application of the process may be realized in a great variety of forms, whilst always remaining simple, easy and not cumbersome.

7. The possibility of concentrating the installation and the staff to work it within a small sized yard facilitates the conduct and supervision of the work.

8. The possibility of placing and loading the receptacle in the immediate vicinity of the fractures reduces to the smallest minimum practicable, the conveyance of the materials to the place where they are to be used in the ground and consequently facilitates the use of active or quick setting materials. This advantage may further be enhanced by the use of continuously loaded receptacles.

9. The large diameter which may be given to the injection pipe system owing to its very small length reduces the risk of obstruction. Furthermore it facilitates the introduction of the materials into the fractures and permits the use of materials larger than those usually used hitherto.

10. The great simplicity of the apparatus to charge the materials for injection, the possibility of lining, at least partly, the inner surfaces of the same with hard substances such as glass, china, etc., and the possibility of preventing, at least with apparatus for discontinuous loading, in contact of the materials with parts working mechanically, reduce to a minimum the cost of upkeep and the renewal of the plant.

Claims.

1. Process for purposes of the character described which consists in loading the materials into a receptacle, closing the loading opening of the receptacle, connecting the receptacle with a source of water under pressure and removing any air which may be contained within the receptacle, establishing communication between the receptacle and the source of water under pressure to produce in the former the higher static pressure obtainable from the latter, and projecting from the receptacle the material and water mixture by the vis viva acquired in accordance with the static pressure previously established in the receptacle.

2. Process for purposes of the character described which consists in loading materials into a receptacle, closing the loading opening of the receptacle, removing any air which may be contained within the receptacle, establishing communication between the receptacle and a source of water under pressure to produce, in conformity with meter observations the highest static pressure in the receptacle that can be obtained from the water under pressure, and projecting the material and water mixture from the receptacle through one or more pipe systems by the vis viva of the mixture acquired in accordance with the static pressure previously established in the receptacle.

3. Process for the purposes described which consists in loading materials within a receptacle, closing the loading opening of the receptacle and expelling the air therefrom, establishing communication between the receptacle and a source of liquid under pressure to produce in the former the highest static pressure obtainable from the latter, and projecting the material and liquid mixture from the receptacle through one or more pipe systems by the vis viva of the mixture acquired in accordance with the static pressure established in the receptacle.

In testimony whereof I affix my signature.

GEORGES JOSEPH MICHEL LEICKNAM.